United States Patent [19]

Godeau et al.

[11] Patent Number: 5,722,451
[45] Date of Patent: Mar. 3, 1998

[54] DEVICE FOR BLEEDING OR DRAINING A DUCT

[75] Inventors: Denis Godeau, Vieilles Maisons; Anthony Garcia, Villemandeur, both of France

[73] Assignee: Hutchinson, Paris, France

[21] Appl. No.: 562,110

[22] Filed: Nov. 22, 1995

[30] Foreign Application Priority Data

Dec. 2, 1994 [FR] France .................. 94 14524

[51] Int. Cl.$^6$ .................. F16K 31/50; F16K 31/528; F16K 43/00
[52] U.S. Cl. .................. 137/315; 184/1.5; 222/549; 222/552; 251/144; 251/216; 251/217; 251/252; 251/351; 251/352; 251/904
[58] Field of Search .................. 251/144, 215, 251/217, 252, 351, 904, 216, 352, 353; 184/1.5; 137/315; 222/548, 549, 551, 552, 559

[56] References Cited

U.S. PATENT DOCUMENTS

| Re. 28,844 | 6/1976 | Dehar | 251/144 |
| 858,771 | 7/1907 | Whitehouse | 251/252 |
| 1,879,320 | 9/1932 | Klett | 251/252 |
| 3,370,827 | 2/1968 | Stehlin | 251/144 |
| 3,910,550 | 10/1975 | Nelson | 251/144 |
| 4,413,804 | 11/1983 | Lanius et al. | 251/904 |
| 4,425,935 | 1/1984 | Gonzalez | 251/904 |
| 4,449,692 | 5/1984 | Rhodes | 251/144 |
| 4,679,618 | 7/1987 | Farkas | 251/144 |
| 5,096,158 | 3/1992 | Burdick et al. | 251/904 |
| 5,246,202 | 9/1993 | Beamer | 251/252 |

FOREIGN PATENT DOCUMENTS

| 403322 | 12/1990 | European Pat. Off. . |
| 2588367 | 4/1987 | France . |

Primary Examiner—George L. Walton
Attorney, Agent, or Firm—Bell Seltzer Intellectual Property Law Group of Alston & Bird, LLP

[57] ABSTRACT

A device for bleeding or draining a duct comprises a member for closing a passage that opens out into the duct, the member having a helical groove formed in its peripheral surface enabling it to be moved in the passage by screwing and unscrewing on a helical rib of a collar embedded in the material defining the passage.

13 Claims, 3 Drawing Sheets

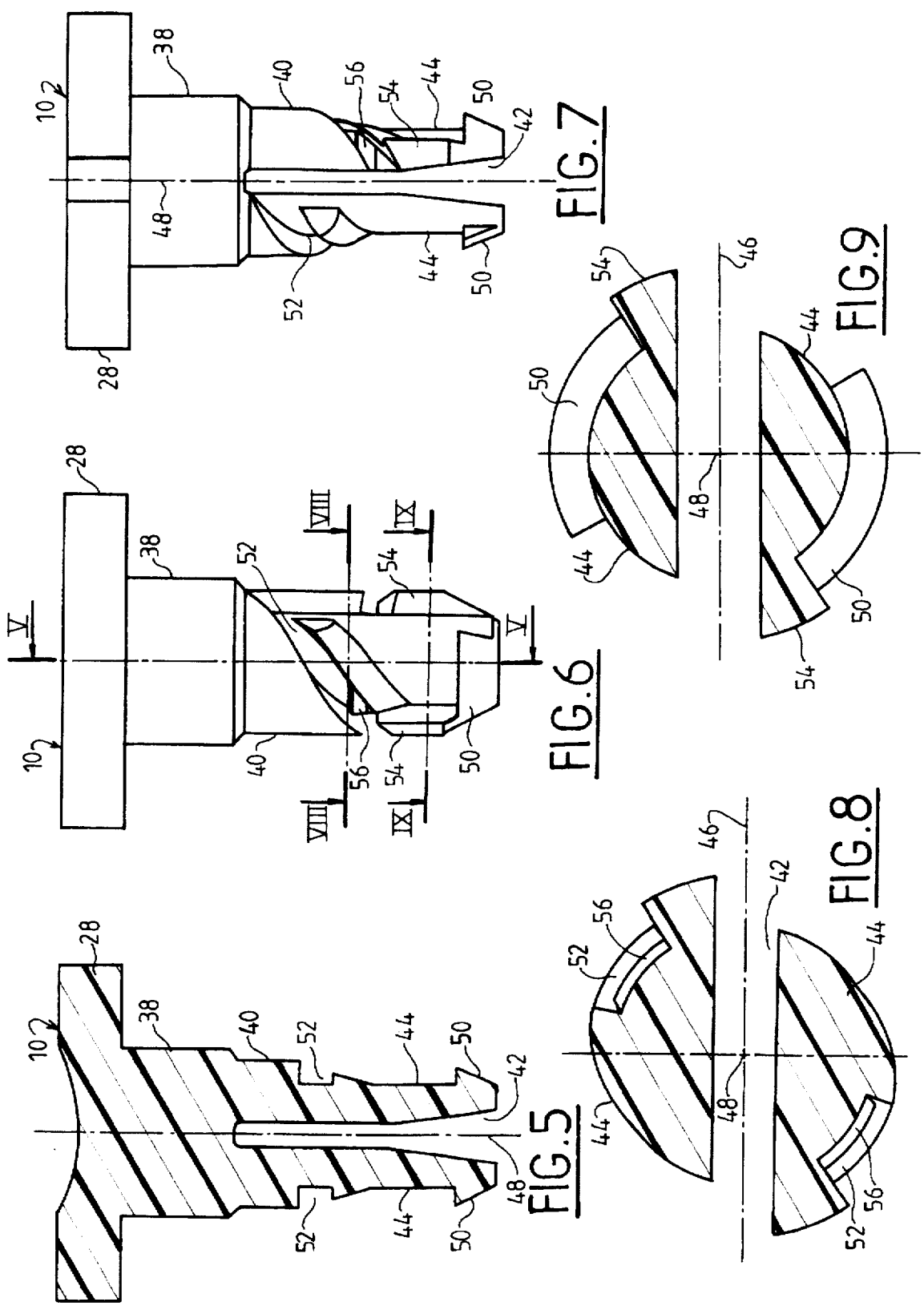

DEVICE FOR BLEEDING OR DRAINING A DUCT

The invention relates to a device for bleeding or draining a duct, the device comprising a member for closing a passage that opens out into the duct, and sealing means co-operating with said member.

BACKGROUND OF THE INVENTION

Devices of this kind are used in the automobile industry, for example for bleeding a duct for circulating the cooling liquid of an internal combustion engine, and also in various other technical fields whenever it is necessary to de-gas, bleed, or drain a liquid.

Proposals have already been made to implement such devices by molding or fixing a boss on a duct, the boss including a through passage which opens out into the duct. A nut-forming insert is fixed, e.g. by adhesive, in the passage or it is partially embedded in the material defining the passage, and it receives a closure screw. When screwed tight, the head of the screw closes the passage in more or less sealed manner, and the seal can be improved by using a sealing ring.

Nevertheless, it is difficult to align the nut-forming insert properly with the axis of the passage so as to make it possible subsequently to install the screw in the nut without difficulty. Any misalignment makes it difficult to install the screw, requiring greater or lesser force for tightening or loosening, and also gives rise to leaks between the head of the screw and the outlet of the passage, and these defects can be made worse by any molding flash at the outside outlet of the passage.

OBJECTS AND SUMMARY OF THE INVENTION

The invention seeks in particular to avoid these drawbacks.

Another object of the invention is to simplify and facilitate the use of a device of the above-specified type, and to make its operation much more reliable.

Another object of the invention is to provide a device of the above-specified type which is particularly easy to install or assemble without risk of error.

Another object of the invention is to provide a device of this type which is universal or almost universal, insofar as it can be used in different fields without special adaptation or modification.

The invention thus provides a device for bleeding or draining a duct, the device comprising a screwable closure member mounted in a passage that opens out into the duct and sealing means co-operating with said member, wherein the member comprises a substantially cylindrical body formed with at least one helical groove in its peripheral surface, in which groove there is engaged a helical rib formed to project from the inside surface of the passage, said body also comprising a de-gassing or fluid-passing channel formed by a longitudinal slot extending from the inside end of the body situated in the passage and enabling the inside end of said body to be resiliently compressed radially.

This device presents various advantages:
- the screwable member can be moved from its closure position to its draining or bleeding position, and vice versa, by rapid rotation;
- the screwable member can be mounted in the above-mentioned passage by resilient snap-fastening or clipping in translation because of the radial elasticity of its inside end;
- this radial elasticity makes it possible to accommodate manufacturing tolerances and play so that the screwable member can be mass-produced at low cost; and
- all of the drawbacks associated with misalignment of a nut in a bleeding or draining passage are avoided.

According to another characteristic of the invention, the body of the member comprises two of the above-mentioned helical grooves which are identical and symmetrical to each other about the axis of the body, and the inside surface of the passage comprises two projecting helical ribs which are identical and symmetrical to each other about the axis of the passage and each of which is engaged in one of the grooves of said body.

This paired and symmetrical disposition of the helical grooves on the body of the screwable member and of the helical ribs on the inside surface of the passage enables the screwable member to be properly guided between its closure position and its bleeding or draining position, and makes it easier to drive.

According to yet anther characteristic of the invention, each above-mentioned groove and each above-mentioned rib extends over less than 180° about the axis of the body or the passage respectively.

The screwable member is then driven between its closure position and its bleeding or draining position by being rotated through less than half a turn.

According to yet another characteristic, each helical groove terminates adjacent to the inside end of the body in a straight longitudinal rib designed to be engaged in a space left empty between the helical ribs of the inside surface of the passage.

When the longitudinal ribs are in the empty spaces between the helical ribs of the passage, the other ends of the helical grooves are substantially in alignment with the outer ends of the helical ribs of the passage, parallel to the axis of the body and of the passage.

Thus, when the device of the invention is being mounted, it suffices to position the closure member properly on the outside opening of the passage and to push it in translation into the passage, thereby bringing it directly into abutment in its closure position by resilient snap-fastening or clipping and without it being necessary to turn it about its axis. The resilient snap-fastening or clipping produces an audible click which confirms that the screwable member has been properly placed in its closure position.

In a first embodiment of the invention, said helical ribs are formed by a perforated frustoconical collar which is embedded in the material defining the passage.

In another embodiment, said helical ribs are formed by being molded on the cylindrical inside face of a tubular part applied to the duct or forming a portion thereof.

In either case, sealing may be provided by annular lips or projections formed on the inside surface of the passage or at the outlet thereof and co-operating in sealed manner with the top portion of the body of the closure member or with a driving head formed at the top end of the body of the closure member, or else by an O-ring mounted on the top portion of the body of the closure member.

BRIEF DESCRIPTION OF THE DRAWINGS

The invention will be better understood and other characteristics, details, and advantages thereof will appear more clearly on reading the following description given by way of example and made with reference to the accompanying drawings, in which:

FIG. 5 is a diagrammatic axial section view on line V—V of FIG. 6 through a closure member of the invention;

FIG. 6 is an elevation view of the closure member;

FIG. 7 is a lefthand view of the closure member of FIG. 6;

FIGS. 8 and 9 are diagrammatic views on a larger scale and in cross-section through said member on lines VIII—VIII and IX—IX of FIG. 6;

MORE DETAILED DESCRIPTION

Figure 1:
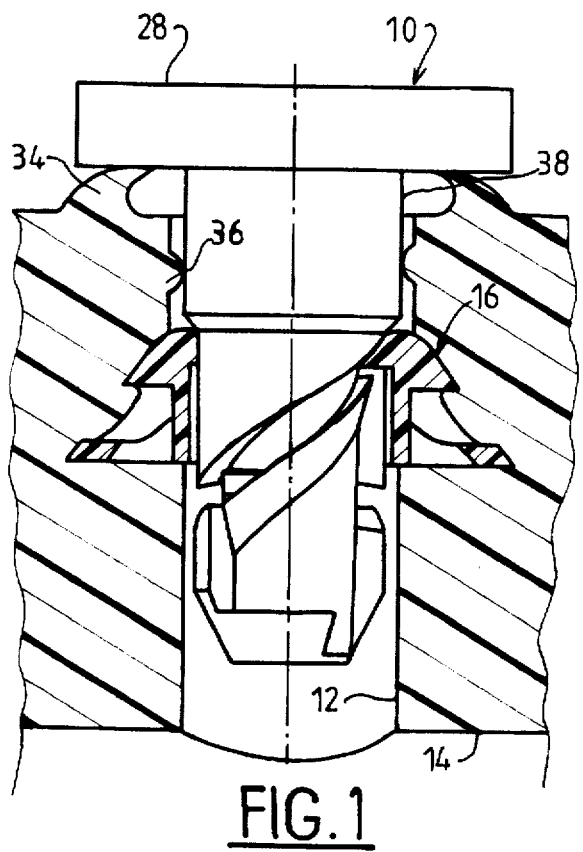
FIG. 1 is a diagrammatic view of a device of the invention partially in axial section.

Reference is made initially to FIGS. 1 to 10 which show a first embodiment of a device of the invention, e.g. constituting a device for bleeding a duct for circulating a cooling liquid for an internal combustion engine, or the like.

The device comprises a screwable member 10 for closing a passage 12 that opens out into a duct 14, the member 10 being mounted in a collar 16 that is embedded in the material defining the passage 12.

The collar 16 which is more clearly visible in FIGS. 2 to 5 comprises a part of generally tapering shape, e.g. made of metal or of plastics material, having a frustoconical outside surface 18 with large perforations to facilitate anchoring the collar in the material defining the passage 12, and it has a cylindrical inside surface 20 from which there project two helical ribs 22 each of which extends over a little less than 180° around the axis 24 of the collar (e.g. over about 150°), so that they are thus separated from each other by two empty spaces 26 which are parallel to the axis 24 and disposed symmetrically to each other about said axis.

The helical ribs 22 are of square or rectangular cross-section and they extend along the entire height of the collar 16.

The collar receives the closure member 10 which is shown in greater detail in FIGS. 5 to 10.

The closure member comprises a drive head 28 of cylindrical shape and including a diametral slot 30 in its top face for receiving the end of a screwdriver, and having two diametrically opposite semicylindrical notches 32 formed in its peripheral surface.

The diameter of the head 28 is greater than the outlet of the passage 12, and the head can co-operate with an annular sealing lip 34 (FIG. 1) formed around the outlet of the passage 12 by pressing thereagainst. An annular rib 36 may optionally be formed projecting from the inside surface of the top portion of the passage 12 to co-operate in sealed manner with the top portion 38 of the body of the member 10.

In a variant, it is also possible to mount a sealing ring on the top portion 38 of the body of the member 10, immediately beneath its drive head 28.

In addition to its cylindrical top portion 38 connected to the head 28, the body of the member 10 includes a bottom portion 40 that has an axial slot 42 extending longitudinally over the entire height of the bottom portion 40 and transversely across the entire width of said portion 40 so that it is constituted by two parallel branches 44 extending on either side of a longitudinal midplane 46 of the member 10, said portions being identical and symmetrical to each other about the axis 48 of the member 10.

At their bottom ends in the drawing, the branches 44 include respective frustoconical rims 50 with the small bases of these frustoconical rims facing downwards while their large bases have an outside diameter that is slightly greater than the diameter between the helical ribs 22 of the collar 16 so that the bottom end of the member 10 can be mounted in the collar 16 by resilient snap-fastening or clipping, with the bottom ends of the two branches 44 being moved towards each other by elastic deformation, the top faces of the frustoconical rims 50 coming into abutment in the opposite direction against the bottom ends of the helical ribs 22 and thus preventing the closure member 10 from being fully extracted from the passage 12.

Each branch 44 is also formed with a helical groove 52 of pitch and cross-section adapted to the pitch and cross-section of the helical ribs 22 of the collar 16, each groove 52 extending over a little less than 180° around the axis 48 and being open at both ends, one end of each groove being in the vicinity of the top of its branch 44 while its other end is a little way from the frustoconical rim 50 and is connected thereto by a straight longitudinal rib 54 extending parallel to the axis 48 and projecting from the branch 44. The radius of the peripheral surface of the rib 54 is slightly less than that of the inside cylindrical surface 20 of the collar 16, and the angular extent of the ribs 54 about the axis 48 is slightly less than that of the empty spaces 26 between the helical ribs 22 of the collar 16 so that the bottom end of the closure member 10 can be inserted inside the collar 16 and positioned angularly relative to the helical ribs 22 because the straight ribs 54 engage in the empty spaces 26 between the ribs 22.

The bottom of each groove 52 includes a small transverse projection 56 which extends around the axis 48 over an angle of about 45° and which is formed in the vicinity of the bottom end of each groove 52, slightly above the longitudinal rib 54 and at a distance such that the top end of the groove 52 in which the transverse rib 56 is located comes beneath the helical ribs 22 of the collar 16 when the member 10 is in its closure position as shown in FIG. 1.

The transverse rib 56 may be biconical in shape as shown in the drawings, with its top face being much more steeply inclined relative to the axis 48 than its bottom face so that the rib 56 constitutes a hard point when beginning to unscrew the member 10.

The collar 16 and the closure member 10 may be made out of plastics material by molding in relatively simple manner, the collar 16 does not include any undercuts and the ribs 22 can be formed without difficulty by means of a core pin that is extracted from the mold by rotation, and the same techniques are used for molding the closure member 10.

The device is used as follows:

With the collar 16 embedded or anchored in the material that defines the passage 12 and positioned in such a manner that the axes of the collar and of the passage 12 substantially coincide, the closure member 10 is presented above the collar 16 and is angularly positioned in such a manner that the longitudinal ribs 54 of its branches 44 are in alignment with the empty spaces 26 between the ribs 22 of the collar 16. It then suffices to push the member 10 along the axis of the passage 12 and of the collar 16 for the bottom ends of the branches 44 to move towards each other by resilient deformation, thereby enabling the frustoconical rims 50 to pass between the helical ribs 22 and thus mounting the member 10 in the collar 16 by resilient snap-fastening or clipping.

The angular orientation of the longitudinal ribs 54 relative to the helical grooves 52 and to the helical ribs 22 of the collar 16 is such that when the member 10 is mounted in this way by resilient snap-fastening or clipping, it automatically and directly takes up the position shown in FIG. 1 which is the position that it would have occupied had it been screwed home, the top ends of the helical ribs 22 being engaged in the top ends of the helical grooves 52 of the member 10.

The member is thus brought directly to its sealed closure position, with sealing being provided by the annular lip 34 at the outlet of the passage 12 having the head 28 of the member 10 bearing thereagainst, and/or by the internal annular projection 36 at the top end of the passage 12 bearing in sealed manner against the top portion 38 of the body of the member 10, and/or by a sealing ring threaded onto the top portion 38 of the body of the member 10 immediately beneath the head 28.

To perform a bleeding, de-gassing, or draining operation, it suffices to turn the member 10 about its longitudinal axis 48 through a little less than half a turn so as to bring the top end of the slot 42 above the annular projection 36, thereby moving the head 28 far enough away from the annular sealing lip 34.

By design, the closure member 10 cannot be extracted from the collar 16 by being unscrewed, the top faces of the frustoconical rims 50 come into abutment against the bottom ends of the helical ribs 22 and oppose any such extraction.

The closure member 10 may be returned to its position in which it provides sealed closure of the passage 12 by being screwed about its longitudinal axis through a little less than half a turn, with screwing being limited by the shoulder formed between the portions 38 and 40 of the member 10 coming into abutment against the collar 16.

In this closure position, and as explained above, the transverse rib 56 of each branch 44 lies beneath the bottom end of the corresponding helical rib 22 of the collar 16 and therefore constitutes a hard point at the beginning of unscrewing, thus preventing the member 10 from unscrewing by itself under the effect of the internal pressure that obtains within the duct 14 and the passage 12.

Figure 2:
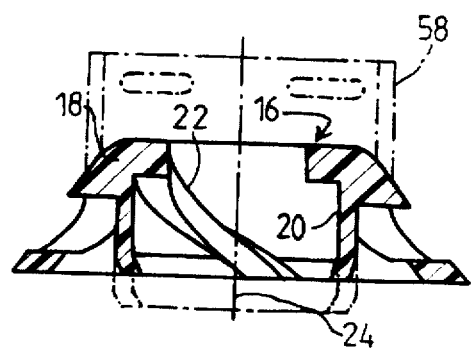
FIG. 2 is a diagrammatic axial section view of a collar forming part of the device.
Figure 3:
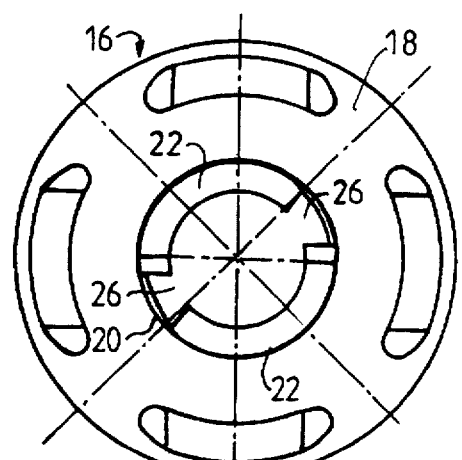
FIGS. 3 and 4 are a diagrammatic plan view and a diagrammatic perspective view of the collar.
Figure 4:
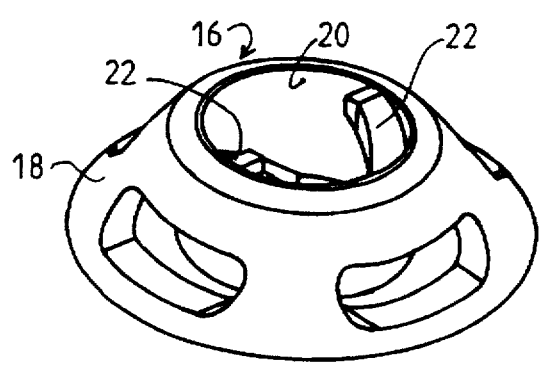
Figure 10:
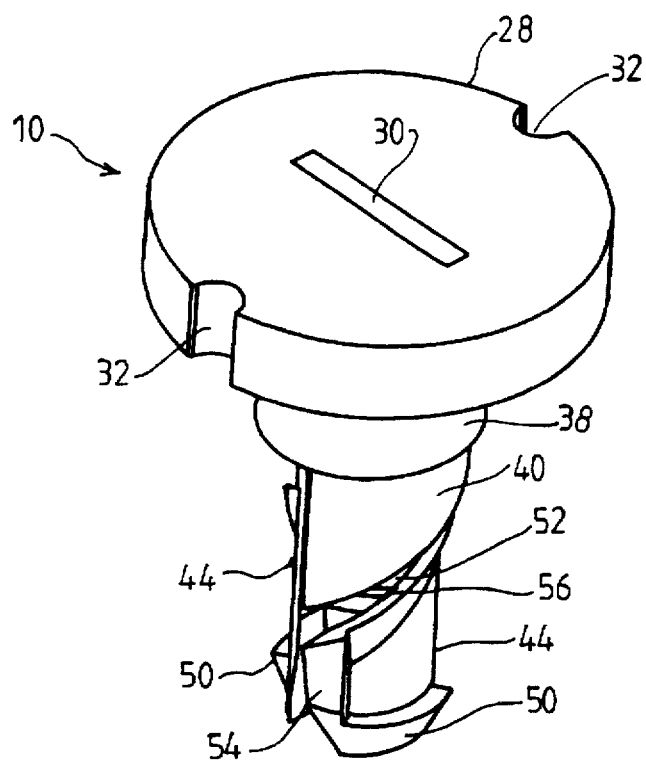
FIG. 10 is a diagrammatic perspective view of the closure member.

In a variant, the collar 16 may include a top cylindrical skirt 58 that is cut open or perforated, as shown diagrammatically in dashed lines in FIG. 2, which skirt is integrally molded with the collar and is intended to be embedded in the elastomer or plastics material defining the passage 12 level with the seal 36, the skirt 58 serving to stiffen said material and to provide the seal 36 with better resistance against pressure, thereby improving the quality of sealing relative to the portion 38 of the closure member.

In addition, the bottom portion of the cylindrical wall 20 of the collar 16 may extend a little way downwards, as shown in dashed lines in FIG. 2, tapering towards a chamfered end so as to improve sealing where the bottom portion of the collar bears against a core during overmolding of the material in which the collar is embedded, thereby preventing any flash of overmolded material projecting into the passage 12 because the tapered bottom end of the wall 20 is squashed against the above-mentioned core when the overmolding mold is closed.

Figure 11:
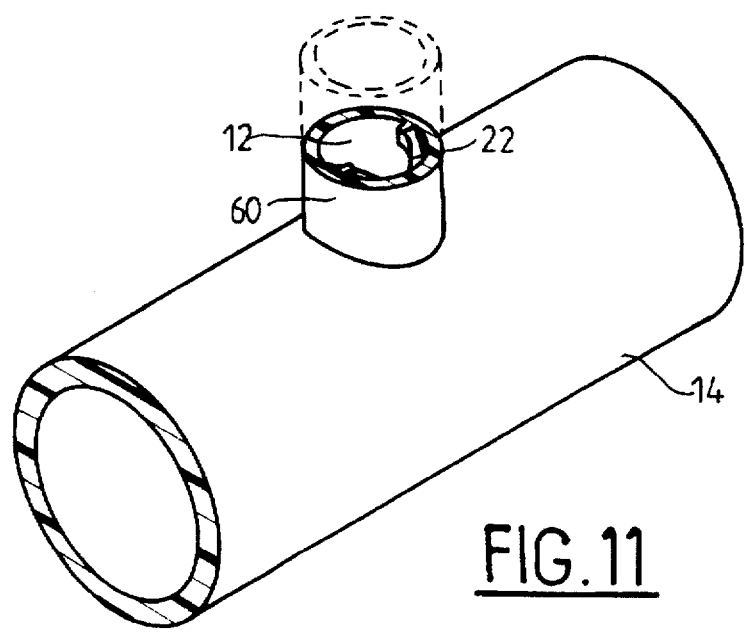
FIG. 11 is a diagrammatic perspective view of a variant embodiment of a portion of the device of the invention.

In the variant embodiment shown diagrammatically in FIG. 11, the device of the invention does not have a collar 16, and the helical ribs 22 are formed directly by molding on the inside cylindrical surface of a tubular part 60 that defines the passage 12 and that is integrally formed with the duct 14 or that is added thereto.

In FIG. 11, this part 60 is shown in section about halfway along its length so that the helical ribs 22 can be seen, its top portion being represented by dashed lines and being analogous to the portion of the passage 12 that is situated above the collar 16 in the embodiment shown in FIG. 1.

In general, the device of the invention is applicable to numerous technical and industrial fields and it provides the advantages of being simple and cheap to manufacture and to assemble.

We claim:

1. A device for closing a passage that opens into a duct for draining thereof, the device comprising a movable closure member mounted in the passage, said closure member comprising a body substantially defined by at least two parallel branches extending in the passage wherein said branches are radially elastic, said body and at least one of said branches include at least one helical peripheral groove and said passage comprises sealing means cooperating with the body of the closure member and at least one helical rib projecting from an inside surface of the passage and co-operating with the helical groove defined by at least a portion of said at least one of said branches so that the closure member can be mounted and sealed in the passage by rotation, and also mounted and sealed in the passage by translation and resilient snap-fastening.

2. A device according to claim 1, wherein the body of the member comprises two said helical grooves which are substantially identical and symmetrical to each other, the passage comprising two projecting helical ribs which are substantially identical and symmetrical to each other and each of which is engaged in one of the grooves of said body.

3. A device according to claim 2, wherein each of said grooves and each of said ribs extend over less than 180° about the axis of the body.

4. A device according to claim 3, wherein each helical groove terminates adjacent to an inside end of one of said branches in a straight longitudinal rib designed to be engaged in a longitudinal space left empty between the helical ribs of the passage.

5. A device according to claim 4, wherein, when the longitudinal ribs are in the said longitudinal spaces between the helical ribs of the passage, the opposite ends of the helical grooves are substantially in alignment with the outer ends of the helical ribs of the passage.

6. A device according to claim 1, wherein each helical groove includes a projection in the vicinity of the its inner end, which projection forms a hard point during rotation of the body.

7. A device according to claim 1, wherein the end of the branches includes an annular rim, that is engageable by radial elasticity of the branches between the helical ribs of the passage and that prevents the body being fully extracted from the passage.

8. A device according to claim 1, wherein said helical ribs and grooves have a U-shaped cross-section.

9. A device according to claim 1, wherein said helical ribs are formed by a perforated frustoconical collar which is embedded in the material defining the passage.

10. A device according to claim 9, wherein the passage includes at least one annular projection co-operating in sealed manner with the body of the closure member, and wherein said collar embedded in the passage has a cylindrical skirt at the level of said annular projection so as to reinforce the resistance of this annular projection to the pressure exerted by the closure member.

11. A device according to claim 9, wherein said collar includes a cylindrical wall whose bottom end tapers.

12. A device according to claim 1, wherein said helical ribs are molded on the inside face of the passage.

13. A device according to claim 1, wherein an O-ring is mounted on a top portion of the body of the closure member.

* * * * *